United States Patent [19]
Johnston, Jr.

[11] 3,735,280
[45] May 22, 1973

[54] WHITE-LIGHT LASER USING DYE COUPLING
[75] Inventor: Wilbur Dexter Johnston, Jr., Holmdel, N.J.
[73] Assignee: Bell Telephone Laboratories, Incorporated, Murray Hill, N.J.
[22] Filed: Aug. 11, 1971
[21] Appl. No.: 170,767

[52] U.S. Cl. ................................................331/94.5
[51] Int. Cl. ..................................................H01s 3/00
[58] Field of Search .....................331/94.5; 330/4.3; 250/199; 350/160

[56] References Cited
UNITED STATES PATENTS 3,321,714   5/1967   Tien ......................................331/94.5
3,605,039   9/1971   Harris et al..........................331/94.5
3,522,553   8/1970   Fox ......................................331/94.5

OTHER PUBLICATIONS

Leonard et al., White Light Laser, Applied Optics, Vol. 9, No. 5 (May 1970) pg. 1209.

Primary Examiner—William L. Sikes
Attorney—R. J. Guenther and Arthur J. Torsiglieri

[57] ABSTRACT

There are disclosed several arrangements for balanced three-color laser light sources. Also disclosed is a modulation arrangement which makes a three-color source readily adaptable for use in a color television receiver. The arrangements are based upon the use of a broadband gain medium, such as a dye laser medium, to modify the intensity relationship between two or more independent transitions or two or more competing transitions of a single laser medium. The same technique can be used with cascaded laser transitions.

6 Claims, 4 Drawing Figures

XENON LASER

WHITE-LIGHT LASER USING DYE COUPLING

BACKGROUND OF THE INVENTION

This invention relates to arrangements for controlling the relative output of a laser on multiple transitions and especially to balanced three-color arrangements for display purposes.

Since the advent of lasers, one of the more attractive applications for them has appeared to be three-color television-type displays. Nevertheless, the techniques used for obtaining appropriate intensities of red, green and blue laser light have generally been cumbersome, inefficient and impractical. Typically, three different lasers, each supplying one of the colors, have been employed together with means for combining the laser beams and with passive filters for balancing their intensities to meet the requirements of the human eye. The combining techniques and the passive filters all produce very undesirable losses, as well as making the apparatus expensive and hard to adjust.

SUMMARY OF THE INVENTION

I have recognized that these problems can be solved simultaneously by employing a multiple-transition laser and at least one additional broadband gain medium, instead of passive filters, to balance the outputs of the multiple transitions and in appropriate cases to provide an additional frequency of oscillation.

More specifically, my invention employs a multiple transition laser in which a dye cell is used to provide a balanced three-color output. In one embodiment, the dye cell couples two noncompeting transitions of the laser and balances their intensities for display use. In another embodiment, a "white light," three-color laser comprises a neodymium ion laser oscillating on three infrared transitions, each half the frequency of red, green and blue, respectively, and two infrared dye cells for balancing the intensities of these transitions. Three separate second harmonic generators are included for doubling the balanced radiations into the desired portions of the visible spectrum.

An additional feature of the latter embodiment of the invention is the adaptability of the arrangement for separate modulation of the three colors as needed in a television display.

BRIEF DESCRIPTION OF THE DRAWING

Further features and advantages of my invention will become apparent from the following detailed description, taken together with the drawings, in which.

DESCRIPTION OF ILLUSTRATIVE EMBODIMENTS

Figure 1:
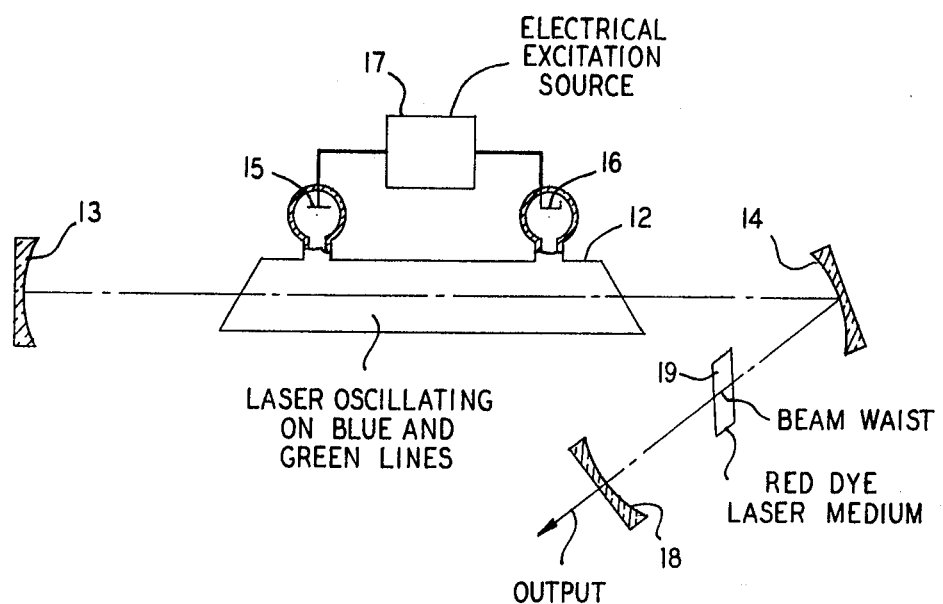
FIG. 1 is a partially pictorial and partially schematic illustration of a first embodiment of my invention.

The specific embodiments of my invention can best be understood with the following background information. The majority of laser gain media other than semiconductor compounds are capable of providing laser action at several different wavelengths, when placed in an appropriate optical cavity and excited appropriately for the desired wavelength. For some of these transitions in certain media, simultaneous laser operation is possible on two or more wavelengths; that is, the "appropriate" optical cavity and excitation conditions mentioned are not mutually exclusive. Two such transitions in a gain medium are said to be independent, if they share neither upper nor lower laser level; in cascade, if the upper level of the one is the lower level of the other; or in competition, if they share the same upper level or the same lower level.

The light output at different wavelengths is unrelated, if the transitions are independent. That is, suppressing the output at one wavelength by external means, such as introducing wavelength-selective absorption into the cavity, does not affect the light output at the other wavelength. If the transitions are in cascade, the light outputs at the different wavelengths vary together, so that oscillation on one transition increases the gain and thus tends to increase the light output at the other transition. When two transitions are in competition, simultaneous operation is unstable and one or the other will dominate completely in the light output.

The introduction of an organic dye solution into the optical cavity provides a mechanism by which the nature of the transition coupling may be modified. Thus, if we have two simultaneously oscillating independent transitions, they may be coupled by choosing a dye which absorbs at the shorter wavelength and fluoresces at the longer wavelength, and which has such other qualities (which are well known from dye laser technology) as will result in gain at the longer wavelength. Thus, in this example, the shorter wavelength transition experiences less, and longer wavelength greater, gain than when the dye is not present. With an appropriate dye density, and with appropriate adjustment of optical spot size in the dye cavity, gain is thus "switched" from the shorter to the longer wavelength transition. With regard to coupling, they appear to be partially in cascade, in that suppression (enhancement) of the shorter wavelength oscillation reduces (increases) the gain for the longer wavelength. There is no reverse coupling. That is, there is no effect on the shorter wavelength by suppression or enhancement of the longer wavelength, as in true cascade.

As another example, if we have two transitions which compete strongly for gain but which could oscillate simultaneously were it not for the competitive coupling, the competition can be reduced from an "all one or all the other" case to a case in which a variable finite ratio of light output may be obtained. This reduction in competition is accomplished by selecting the optical cavity so that oscillation is obtained on the shorter wavelength transition in the absence of the dye. When the dye is added, again with appropriate density and in a position in the cavity with appropriate optical spot size, gain is again switched from the short wavelength transition to the long wavelength transition, bringing it above threshold. It cannot now extinguish the short wavelength oscillation, however, since the additional gain switched to the long wavelength transition is proportional to the power in the cavity at the short wavelength transition. The ratio at equilibrium may be adjusted by varying the total excitation, dye density, spot size in the dye cell, and initial absorptive or transmissive discrimination (if any) against the longer wavelength or in favor of the shorter.

The embodiment of FIG. 1 demonstrates the coupling of independent transitions of a xenon laser 12, which is disposed in a folded optical resonator including the highly reflective back mirror 13, the highly reflective oblique incidence mirror 14 and the partially reflective output mirror 18. Mirror 18 has reflectivity of about 80 percent at 5,352 Angstrom units and at 5,956 Angstrom units, the wavelengths of two independent laser transitions in the xenon laser 12 when subjected to a direct current discharge from a source 17 connected between anode 15 and cathode 16.

Also disposed in the folded optical resonator is the dye cell 19, which has Brewster-angle entrance and exit surfaces forming the Brewster angles in the same plane as the plane of the folded optical resonator. The astigmatism of these Brewster-angle surfaces of dye cell 19 is partially compensated by the choice of angle between the axes of the two sections of the folded optical resonator, as taught in the copending application of A. Dienes et al, Ser. No. 154,087, filed June 17, 1971, and assigned to the assignee hereof. The dye cell 19 illustratively included a mixture of Rhodamine 6G and Rhodamine B dyes in a methanol solution. The relative concentrations of the dyes depend upon the particular reflectivity and loss characteristics of the resonator and the desired color balance and are selected as will be described hereinafter.

Further details of the embodiment of FIG. 1 are as follows:

For certain preliminary experiments, the reflectivity and radii of mirrors 13 and 14 were selected to provide oscillation of the laser 12 at 5,352 Angstrom units, as well as substantial reflectivity at 5,956 Angstrom units and 6,271 Angstrom units, the latter of which is a red visible radiation available in a xenon laser. The radii of reflectors 14 and 18 provided the waist of the beams in the center of dye cell 19, through which the dye was flowed to avoid bleaching and damaging effects. The xenon discharge tube 12, in my experiments, was pulsed electrically so that optical pulses of about 250 nanoseconds duration were obtained 10–20 times per second.

Figure 4:
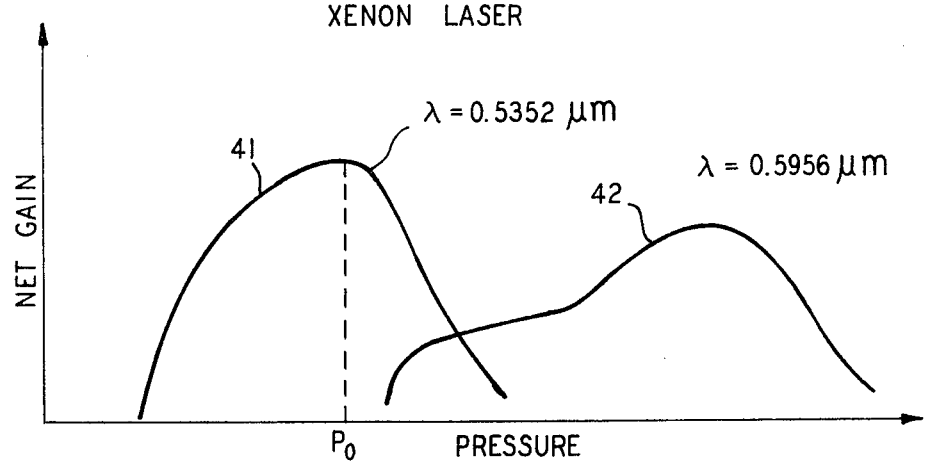
FIG. 4 shows curves useful in explaining the operation of the embodiments of FIGS. 1 and 3.

The operation of the embodiment of FIG. 1 can be understood as follows: The dependence of the gain on total gas pressure in tube 12 for the 5,352 Angstrom and 5,956 Angstrom transitions in tube 12 is illustrated by curves 41 and 42, respectively, of FIG. 4, in the absence of dye cell 19. Note that there are regions of curves 41 and 42 that indicate that either transition will oscillate alone, specifically, to the left and right of the region of overlap, and a region of overlap where independent oscillations on both transitions occur simultaneously. If the pressure is adjusted to the operating point on curve 41 having pressure $P_o$, the 5,352 Angstrom line is oscillating strongly and the 5,956 Angstrom line is somewhat below threshold. Next, the concentration of Rhodamine 6G dye in cell 19 is gradually increased until the 5,956 Angstrom unit transition is brought above threshold and its coherent radiation is "turned on." Concurrently, the power at 5,352 Angstrom units decreases. A dye concentration of the Rhodamine 6G corresponding to a one-way absorptive loss of 17 percent at 5,352 Angstrom units was found to be optimum to maximize the output at 5,956 Angstroms for the particular arrangement of FIG. 1 having the gains and losses present in my early embodiment. Such two-color oscillations are an adequate demonstration of the principle of my invention.

For a balanced, three-color output, Rhodamine B dye is now increased in concentration in cell 19 until the output of light at 6,271 Angstrom units nearly equals that of the other two transitions. Final adjustments of both dye concentrations are now made until the intensities of all three transitions are sufficiently equal to be useful for display purposes, or until they have reached a desired balance, regardless of objective equality.

In some experiments, lines other than the 5,352 and 5,956 Angstrom unit lines were oscillating as well. These lines were in the 4,700–5,100 Angstrom range. Several of the weaker of these were extinguished upon introduction of the dye cell, even at zero dye concentration. Increasing the concentration of the dye had no effect on those which remained oscillating up to concentrations sufficient to extinguish the 5,352 Angstrom transition.

The additional gain provided to the 5,956 Angstrom transition by the dye is proportional to the product of dye concentration and the intensity of 5,352 Angstrom radiation in the dye. The 5,352 Angstrom power varies oppositely to dye concentration. The intensity of the 5,956 Angstrom radiation may be increased by decreasing the optical spot size at the dye.

In my preliminary experiment, it was verified that gain could indeed be coupled, even in a nonoptimum cavity configuration, from the shorter wavelength to the longer wavelength of two ordinarily independent transitions of a gain medium. The scheme is obviously generalizable to other transitions in Xe or other gas discharges, specifically to the three-color case mentioned above, and to other types of gain media such as crystalline or liquid materials. It is only necessary that the shorter wavelength transition lie within the absorption (or pump band) of the gain medium, and that the longer wavelength lie within the gain bandwidth of the gain medium.

The utility of this scheme is that it provides a mechanism to "even out" or otherwise adjust the ratio of optical powers among several wavelengths available from a single laser and to adjust the ratio by an active, rather than passive, means, so that losses are minimized. It is readily shown by rate equations, and is indeed intuitively obvious, that it is always more advantageous to achieve color balance via active than passive means, that is, color selective filtering, in the sense that a particular balance can be obtained at greater total optical power. Thus, at worst, the dye may be chosen to act as a passive attenuator, and if it transfers any gain at all, one can only have more efficient overall operation. I have shown that the gain transfer can be achieved stably.

I have recognized that if two long wave transitions are coupled to the same short wave one by the same or different dye cells, they will be coupled competitively, in second order, to each other. This need not result in the extinction of one by the other, as we can show by considering the coupling of competitive transitions in general.

Figure 2:
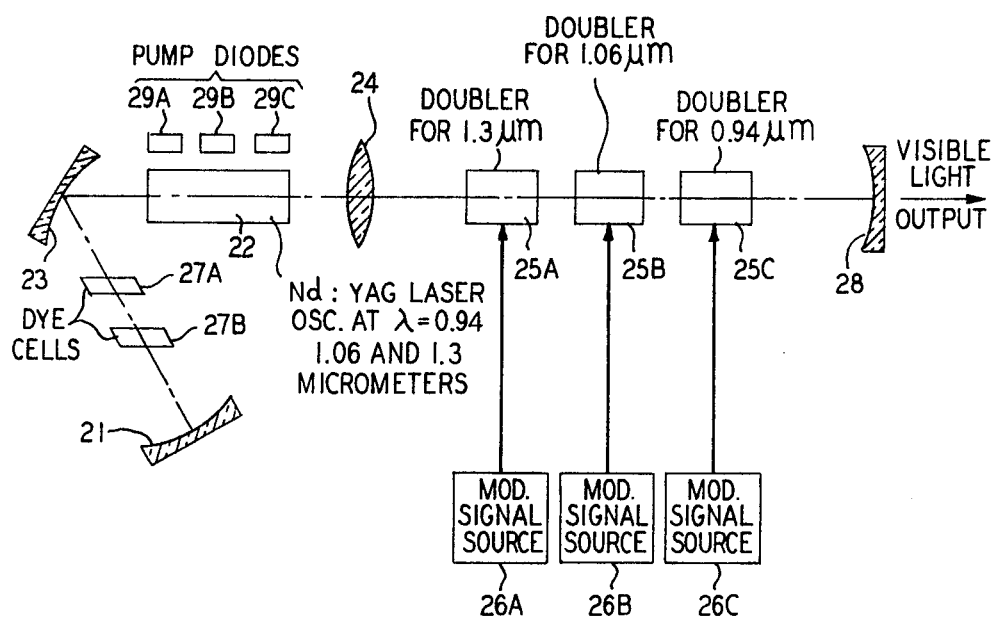
FIG. 2 is a partially pictorial and partially block diagrammatic illustration of a second embodiment of my invention providing separate modulability of the three different radiations.

An embodiment which controls the competition of competing transitions is illustrated in FIG. 2. The two or more transitions are said to be in competition when they share the same upper or lower level.

More specifically, the embodiment of FIG. 2 includes a neodymium laser 22 which is capable of oscillating at wavelengths of $\lambda = 0.94$, 1.06 and 1.3 micrometers and a folded optical resonator, including reflectors 23, 21 and 28, the first two of which are highly reflective for the visible light radiations, and the latter one of which is transmissive to the visible light radiations. All are highly reflective at the infrared wavelengths. In addition to some suitable means for pumping the laser rod 22, such as pump diodes 29A, 29B and 29C, which are illustratively $GaAs_xP_{1-x}$ mixed crystal electroluminescent diodes, the embodiment of FIG. 2 also includes two dye cells 27A and 27B, respectively, adapted to stabilize the 1.06 and 1.3 micrometer transitions with respect to the shorter wavelength 0.94 micrometer transition. As in the preceding embodiment, reflectors 21 and 23 provide a sufficiently small spot size in the dye cells 27A and 27B that they can provide gain at 1.06 and 1.3 micrometers, respectively. Further, to get a visible output, the laser of FIG. 2 includes the doubler 25A for the 1.3 micrometer radiation, the doubler 25B for the 1.06 micrometer radiation, and the doubler 25C for the 0.94 micrometer radiation. Doublers 25A–25C illustratively include respectively differently oriented barium sodium niobate or lithium iodate crystals. Each of the doublers 25A through 25C is coupled to a modulation signal source 26A through 26C, respectively, which switches the doubler in and out of phase matching in order to superimpose upon the red, green or blue light, respectively, the desired modulation content of that particular color in a display which will be produced by scanning means (not shown).

The operation of the embodiment of FIG. 2 may be understood as follows: Preferably, the reflectivity or loss of the optical resonator is initially adjusted so that only the shorter wavelength 0.94 micrometer transition oscillates, in the absence of dyes in cells 27A and 27B. The dye cell 27A is then filled with a cyanine infrared dye selected so that gain is transferred from the 0.94 micrometer transition to the 1.06 micrometer transition. The latter cannot now compete sufficiently with the short wavelength oscillation to quench it, since the 1.06 micrometer transition is above threshold only by a quantity proportional to the intensity of the short wavelength 0.94 micrometer oscillation. Thus, simultaneous oscillation of competitive transitions is obtained over a range of ratio of long wavelength-to-short wavelength power from zero to some finite adjustable value which depends upon the concentration and other characteristics of the dye, the nature of the optical transitions of the laser 22 and the cavity arrangement. Next, the dye cell 27B is filled with a cyanine infrared dye different from that in cell 27A and chosen to transfer gain from the 1.06 micrometer transition to the 1.3 micrometer transition. The dye in cell 27B may alternatively be chosen so that the 0.94 micrometer radiation, as well as the 1.06 micrometer radiation, lies within its absorption bands that yield a gain at 1.3 micrometers. For example, the 0.94 micrometer radiation may correspond to an absorption band from a ground state to second excited singlet state in the dye of cell 27B.

If, initially the 1.06 and 1.3 micrometer transitions were just suppressed in the absence of the dye and then the dyes were added to bring both the 1.06 micrometer transition and the 1.3 micrometer transition above oscillation threshold, then the dye concentrations and, if need be, the spot sizes at each dye cell may be further adjusted to obtain the desired power balances among the three wavelengths.

To provide a three-color, visible source of very good chromaticity coverage, the three infrared wavelengths may now be doubled by the doublers 25A to 25C, each crystal within each doubler being oriented to phase match a different one of the infrared waves to its second harmonic waves. It may be noted that if the folded nature of the cavity is not sufficient to uniquely determine the polarization of radiations emitted by the laser 22, then a Brewster-angle end surface on the laser 22 may be provided for that purpose.

In providing separately modulatable red, green and blue beams at the output, the arrangement of FIG. 2 is not only more compact and less expensive than the prior art arrangement of three separate lasers and a beam combining network, but also requires much less drive power for a given modulation index of each color. The latter result derives from the residual competitive coupling between the three infrared beams. A rate equation analysis shows that increasing the visible light output in response to the corresponding modulating signal source at the doubler decreases the circulating power in the resonator at the corresponding infrared wavelength. This decrease in turn decreases the circulating power and hence the second harmonic power at constant coupling of both of the other two wavelengths and vice versa. While these decreases obviously occur for an increase in blue output light, since both dye cells are deprived of driving power, careful consideration will also show that corresponding decreases occur for an increase in red or green output light, since the corresponding decrease in the intensity of radiation at 1.06 or 1.3 micrometers increases the absorptivity of cell 27A for the 0.94 micrometer radiation and deprives the other cell of part of its driving power, in the first instance, or increases the absorptivity of both of the cells, in the second instance. The driving power to the other two doublers is thereby decreased.

While an optical scanner for the output is not shown and can be of any conventional type, it should be obvious that the modulating signals of source 26A through 26C can be synchronized with the scanning so that the desired color format is displayed.

Although not discussed in connection with the foregoing embodiments, it should also be clear from the basic principles of those embodiments that the power ratio in cascade transitions may also be altered by insertion of broadband laser media which provide gain at the longer wavelength and transfer power from the shorter wavelength transition to the longer wavelength transition.

The dye solutions in the embodiments of FIG. 1 and FIG. 2 may also be replaced with a dye or other broadband laser active media in a plastic or crystalline host. It is only necessary that the required pump and gain characteristics, such as their frequency bands, be chosen. A modification of the embodiment of FIG. 1 illustrating this principle is shown in FIG. 3.

Figure 3:
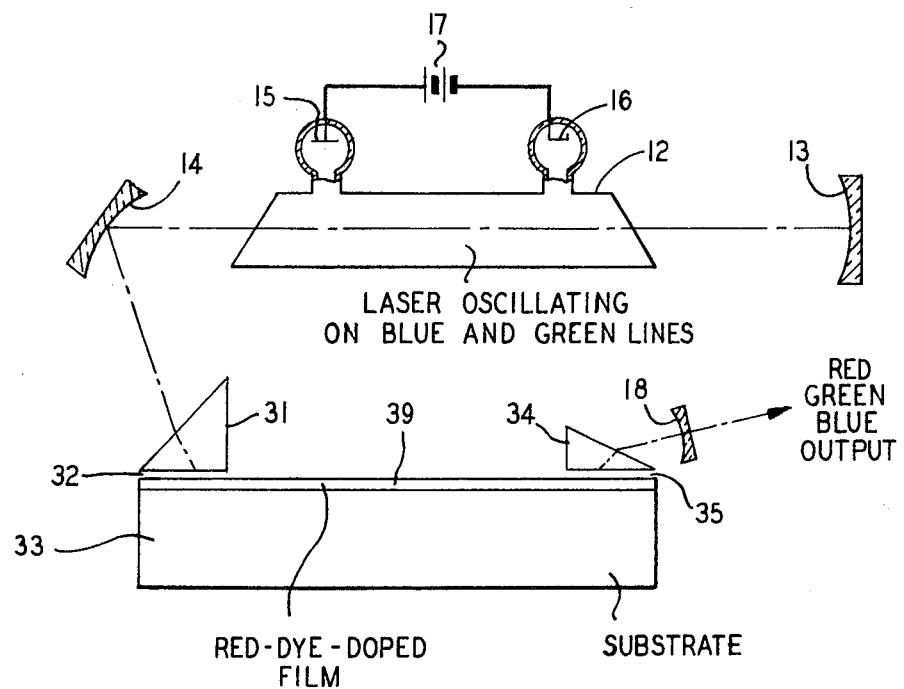
FIG. 3 is a modification of the embodiment of FIG. 1 employing a broadband active thin film.

In the embodiment of FIG. 3 all components labeled the same as in FIG. 1 are essentially the same as in the embodiment of FIG. 1. The principal differences from the embodiment of FIG. 1 are that the dye cell 19 has been replaced by the thin film assembly, including prisms 31 and 34, substrate 33 and thin film 39.

Illustratively, the substrate 33 is a low index (1.47) PYREX glass and the film 39 is a polyethylene film, index 1.55, doped with Rhodamine 6G and Rhodamine B, such as were used in the embodiment of FIG. 1. The film may be applied in liquid form to substrate 33 by dipping, spraying or painting. The input and output coupling are provided by the prisms 31 and 34, which are separated by film 39 by a small gap 32, as taught by P. K. Tien in U.S. Pat. No. 3,584,230, issued June 8, 1971. A substantial gain in light intensity in the thin film is achieved so that the dye concentration need not be as great as in cell 19 of FIG. 1, better cooling is obtained so that the rate of destruction of the dye is lower and, in addition, the focusing requirements are substantially reduced. It will be noted that output mirror 18 closes an optical oscillator which extends through the prisms 31 and 34 and the intervening portion of thin film 39. As damage of the dye in thin film 39 occurs, it is merely necessary to displace the thin film 34 laterally under the prisms so that the oscillation path passes through a fresh portion of the dye.

I claim:

1. A laser comprising an active medium having at least two transitions capable of lasing, means for resonating the radiation from said transitions, means for pumping said active medium, said resonating means and said pumping means producing radiation from the shortest wavelength one of said transitions substantially in excess of its oscillation threshold and radiation from at least another longer wavelength transition near its respective oscillation threshold, and means including a second laser active medium within said resonating means for absorbing a portion of the radiation from said one shortest wavelength transition to produce a population inversion in said second medium at said other wavelength and at a third wavelength that is longer than the shortest wavelength, said absorbing means and said resonating means providing a third oscillating radiation at said third wavelength, whereby stable oscillations are obtained at all three wavelengths.

2. A laser according to claim 1 in which the two transitions of the active medium are independent transitions, and said absorbing means has an absorption for a portion of the radiation of the shorter wavelength transition and provides gain for the longer wavelength transition to couple said two transitions.

3. A laser according to claim 1 in which the two transitions of the active medium are competing transitions, said resonator favoring the shorter wavelength transition in the absence of the absorbing means, and the absorbing means has an absorption for a portion of the radiation of the shorter wavelength transition and provides gain for the longer wavelength transition to reduce the competition of said two transitions.

4. A laser comprising an active medium having at least two transitions of first and second frequencies integrally related to the frequencies of blue and green light, said transitions both being capable of lasing, means for resonating the radiation from said transitions, and a second active medium capable of lasing at a third frequency integrally related to a frequency in the red portion of the spectrum, said second medium being disposed in said resonating means to absorb a portion of one of the radiations at one of the said first and second frequencies, the absorption of said second medium providing a selected balance of radiation intensities at the first, second and third frequencies.

5. A laser comprising an active medium having three transitions of first, second and third frequencies that are respectively half of the frequencies of red, green and blue light, said transitions all being capable of lasing, means for resonating the radiation from said transitions, means for providing a selected balance of radiations from said transitions, comprising at least one dye-containing active medium disposed in said resonator and characterized by absorption for at least one of the radiations of the second and third frequencies and by resultant gain for the others of said radiations, and frequency-doubling means disposed in said resonator for generating said red, green and blue light from said radiations.

6. A laser according to claim 5 in which the frequency-doubling means comprises three phase-matched optical second harmonic generators and means for driving said generators in response to signals to vary the degree of phase matching and provide modulation of the light, whereby the red, green and blue light components exhibit coupled interaction to any one of said signals.

* * * * *